2 Sheets--Sheet 1.

W. N. WHITELEY, J. FASSLER & O. S. KELLY.

Cider-Mills.

No. 5,978. Reissued July 21, 1874.

Attest

Bernard Drahman

John O'Gara

Inventor

Whiteley, Fassler & Kelly

By Wood & Boyd their Attorneys.

THE GRAPHIC CO. PHOTO-LITH. 39 & 41 PARK PLACE, N.Y.

2 Sheets--Sheet 2.

W. N. WHITELEY, J. FASSLER & O. S. KELLY.

Cider-Mills.

No. 5,978. Reissued July 21, 1874.

Inventor

Whiteley Fassler & Kelly

By Wood & Boyd

Their Attorneys

Witness

Bernard Drahman

John O'Gara

THE GRAPHIC CO. PHOTO-LITH. 39 & 41 PARK PLACE, N.Y.

UNITED STATES PATENT OFFICE.

WILLIAM N. WHITELEY, JEROME FASSLER, AND OLIVER S. KELLY, OF SPRINGFIELD, OHIO, ASSIGNORS, BY MESNE ASSIGNMENTS, TO THOMAS, LUDLOW & RODGERS, OF SAME PLACE.

IMPROVEMENT IN CIDER-MILLS.

Specification forming part of Letters Patent No. 40,987, dated December 15, 1863; reissue No. 2,704, dated July 30, 1867; reissue No. 5,978, dated July 21, 1874; application filed July 1, 1874.

*To all whom it may concern:*

Be it known that we, WILLIAM N. WHITELEY, JEROME FASSLER, and OLIVER S. KELLY, of Springfield, in the county of Clarke and State of Ohio, have invented certain new and useful Improvements in Mills for Grinding Fruit, Vegetables, &c., and pressing juice therefrom; and we do hereby declare the following to be a full, clear, and exact description of the same, reference being had to the accompanying drawings, in which—

Figure 1:
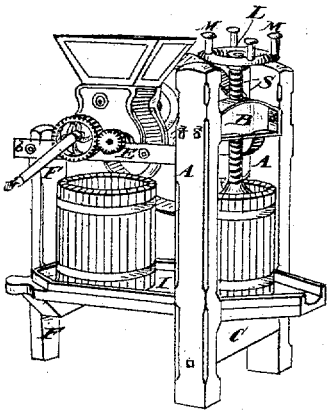
Figure 2:
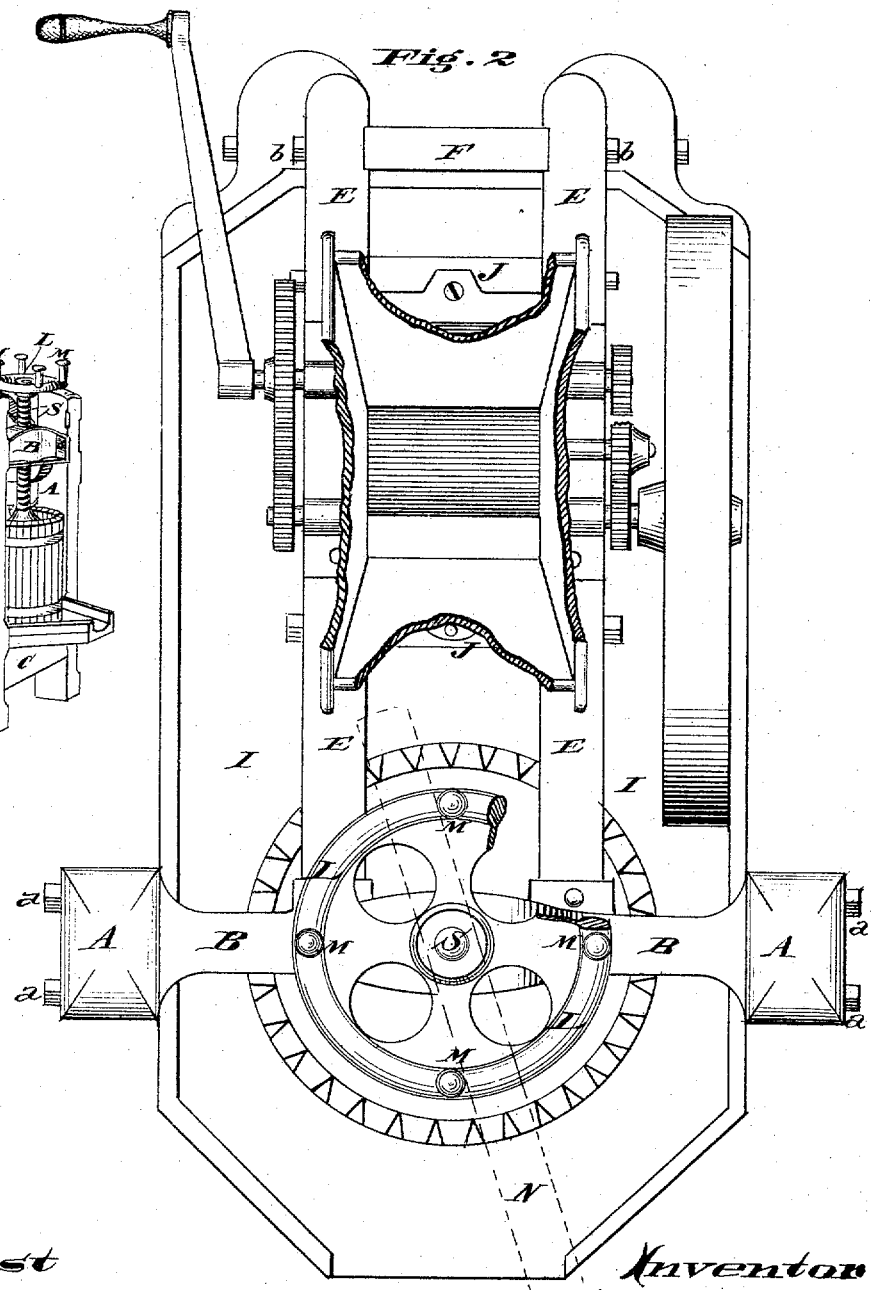
Figure 3:
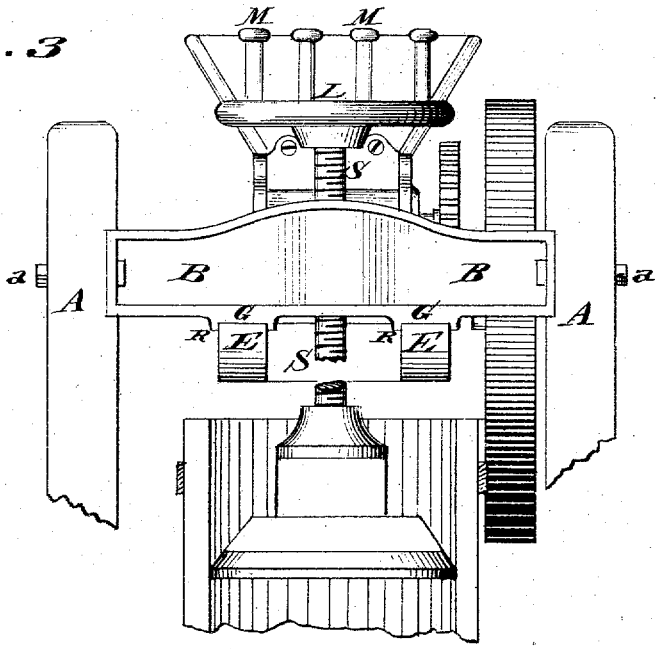
Figure 4:
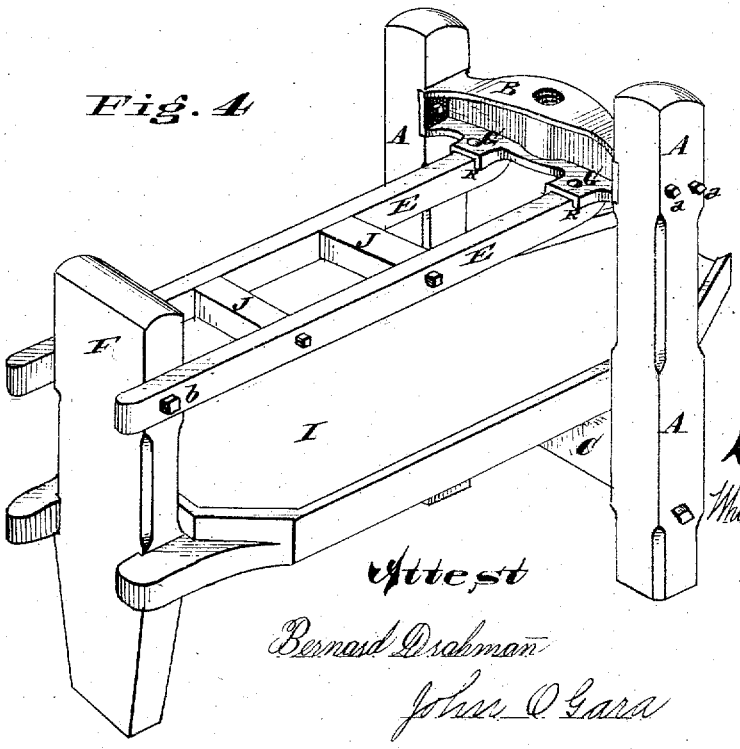

Figure 1 is a perspective view of the machine. Fig. 2 is a plan view of the same. Fig. 3 is a front elevation of a portion of the machine. Fig. 4 is a perspective view of the frame of the machine.

Our invention relates to that class of mills which are termed portable and combined, because they are made in such proportions as to be easily transported from place to place without separation of their parts, and because the same frame-work supports both the grinding and pressing machinery; and that part of this invention secured in this patent relates particularly to the form and construction of the frame, the other part of the invention being shown in reissue No. 2,499, Division A, dated February 26, 1867.

That others may understand the construction of our mill-frame, we will particularly describe it.

A A are the front posts of the mill-frame. These posts we make of wood, and connect them near the lower ends by the stout wooden girder C, and near their upper ends by the stout iron press-beam B. These posts and their connecting-beams form the pressing-frame. The beam B swells both vertically and laterally at its central portion, in order to preserve its required strength. The screw S is passed through this enlarged portion, the female thread being cut in the sides of the hole through which it passes. The beam B has flanges along its edges and at its ends. The former give strength to the beam, and the latter furnish convenient means for securing the beam to the posts A A. The bolts *a a* pass through the posts A, and into these latter flanges, so as to secure the posts and beam together. During the operation of pressing, the cheese-tub stands upon the platform I, and directly over the girder C, beneath the screw S. F represents the rear support of the machine, which is preferably made in a solid piece. The platform I connects the rear support F at its lower portion to the girder C, and at its upper portion it is connected at its upper end to the beam B by the rails E E, and these are also provided with two cross-bars, J J, upon which the grinding-box and hopper rest. These rails and the cross-bars J J we call the grinding-frames. The beam B is provided with lugs or ears G G, projecting laterally, to which the rails E E are fastened, a single screw or bolt in each being sufficient to secure them in place. These lugs are preferably made with lips R R.

The grinding mechanism is supported by an upper platform attached in front to the cross-beam, and at the other end to the rear support, and having an opening under the hopper for the rolls, the preferred construction being to place the rails E E a sufficient distance apart to admit of the grinding-rolls working between them and cross-bars J J. To secure the frame against lateral strain from the operation of the grinding mechanism, and at the same time to allow the rear support of the frame to be at a point near the center, we attach the rear support F between the rails E E, and attach the rear end of the platform I to the rear support vertically under the rails E E.

By constructing the frame of our machine in this way, several objects are secured: First, economy of material, because the opposite parts of the frame are brought as near together as possible, and thus the shortest practicable connecting-timbers are used. These timbers, being of short span, may also be smaller in dimension, while preserving the requisite strength. Second, cheapness and facility of manufacture. As the cross-timbers are short and contain less material they are less costly, and there is less labor required to finish them. The support F, occupying a central position, furnishes the means of supporting the rear of the machine at a given point at or near the center, whereby the machine is enabled to stand firmly upon uneven surfaces without wrenching the frame or binding the gear.

The nature of the ground may be such that the rear support may have a bearing upon its entire width or only upon a portion of it; nevertheless the mill will maintain a firm and solid position, from the fact that its location is so nearly central, and the platform I is so connected to the support F, that a rigid joint is formed thereby, and thus the rack and strain of the frame incident to mills with four posts located at equal distances apart, which is the usual mode of construction, is avoided. This is a point of no slight importance, as it combines economy of material and expense, and adds strength, durability, and convenience—convenience from the fact that, by thus narrowing the frame, the operator is enabled to stand directly behind the driving-crank, and thereby expend his labor to the best effect and with the greatest possible ease to himself; it also renders it more convenient to pass the cheese-hoops in and out without interference with the frame of the mill. No cause will bring a machine to pieces more quickly than the racking of its joints, in consequence of an uneven foundation.

The cheese-hoops stand upon the platform I, one beneath the grinding-rollers, and one beneath the press-screw S, so that the operations of grinding and pressing may go on simultaneously. The screw S, at its lower end, is provided with a loose step or collar, which rests upon the follower within the cheese-hoop while pressing. This collar is attached to the screw by a screw or key which enters a channel cut in the lower end of the screw-rod. At the upper end of the screw is the hand-wheel L, by which the screw is operated. From its upper side project four pins, M, which the hands may seize in turning the screw; or the lever N may be placed between them when the screw is to be forced down with power. The platform I has a raised edge, and at its front end a channel and spout to convey the expressed juice to a proper receptacle.

Having described our invention, what we claim as new, and desire to secure by Letters Patent, is—

1. In the frame of a combined grinding and pressing fruit-mill, the combination of the platforms E E and I and rear support F, substantially as shown and described.

2. The beam B, serving as a top girder, a press-beam, and a plate for supporting the rails E E, attached to it between the screws S and posts A A, substantially as shown and described, and for the purposes set forth.

3. The press-beam B, provided with lugs or ears G G, for the purposes shown and described.

4. The arrangement of the posts A A, press-beam B, girder C, rear support F, and platforms I and E E, to form the frame of a combined grinding and pressing fruit-mill, substantially as set forth and described.

In testimony whereof we have hereunto set our hands this 27th day of June, 1874.

WILLIAM N. WHITELEY.
JEROME FASSLER.
OLIVER S. KELLY.

Witnesses:
A. P. LINN COCHRAN,
GEO. W. BURNS.